United States Patent [19]

Watanabe et al.

[11] Patent Number: 5,748,854
[45] Date of Patent: May 5, 1998

[54] ROBOT POSITION TEACHING SYSTEM AND METHOD

[75] Inventors: Atsushi Watanabe; Tomoyuki Terada; Shinsuke Sakamoto, all of Yamanashi, Japan

[73] Assignee: Fanuc Ltd, Minamitsuru-gun, Japan

[21] Appl. No.: 490,761

[22] Filed: Jun. 15, 1995

[30] Foreign Application Priority Data

Jun. 23, 1994 [JP] Japan ........................ 6-163295

[51] Int. Cl.⁶ .................. G06K 9/62; G06F 15/46
[52] U.S. Cl. .................. 395/93; 395/80; 395/94; 901/3; 901/4; 901/31; 318/568.16; 318/568.21
[58] Field of Search .................. 395/93, 80, 94; 901/3, 31, 4; 318/568.16, 568.21, 568.13

[56] References Cited

U.S. PATENT DOCUMENTS

| | | | |
|---|---|---|---|
| 4,956,790 | 9/1990 | Tsuchihashi et al. | 901/3 |
| 5,066,902 | 11/1991 | Watanabe | 901/3 |
| 5,300,868 | 4/1994 | Watanabe et al. | 901/3 |
| 5,566,247 | 10/1996 | Watanabe et al. | 382/155 |

*Primary Examiner*—George B. Davis
*Attorney, Agent, or Firm*—Staas & Halsey

[57] ABSTRACT

A robot position teaching system and method including a robot controller to control a robot, a visual sensor to measure a three-dimensional position, an image processing device to measure a position by processing and analyzing an image recognized by the visual sensor, and a position teaching unit provided with a grasping portion having a size which can be grasped by a hand of an operator, and an index which can visually be recognized by the visual sensor, and is disposed at a distal end of a rod-type body extending from the grasping portion. The operator turns on a moving switch of the position teaching unit such that the robot controller moves the robot toward a position of the index recognized by a camera. When an approach teaching switch of the position teaching unit is turned on after movement of the robot is stopped, data of a current position of the index recognized by the camera is stored as teaching position data. On the other hand, by turning on an arrival teaching switch, a current position of the robot is stored as the teaching position data.

6 Claims, 4 Drawing Sheets

ROBOT POSITION TEACHING SYSTEM AND METHOD

BACKGROUND OF THE INVENTION

1. Field of the Invention

This invention relates to a robot position teaching system and method in which a position teaching unit is used to teach a position to an industrial robot.

2. Description of the Related Art

In the most typical method of teaching a position to an industrial robot (hereinafter briefly referred to as robot), the robot is jog-fed to reach a desired teaching position so as to store its current position, i.e., the desired teaching position in the robot. This method is typically executed according to a procedure as shown in FIG. 5.

Initially, a reference coordinate system at a time of jog-feed is set (Step ST1). The reference coordinate system is selected from some coordinate systems preset in a robot control unit, or is newly set. Thereafter, a feed rate for override is specified (Step ST2). The feed rate is set to a low rate when, for example, careful jog-feed is required at a position near a workpiece. Subsequently, among some jog-feed keys such as +X key, −X key, +Y key, and −Y key, an operator selects and presses down one key corresponding to a desired feed direction such that the robot can be moved to approach the desired teaching position (Step ST3). In actuality, it is hardly possible to move the robot to approach the desired teaching position by only one specified key among some jog-feed keys. Typically, the several jog-feed keys should be used in the course of the movement.

When the robot approaches the desired teaching position, according to visual measurement, the operator decides whether or not additional movement of the robot is necessary (Step ST4). If it is decided that the robot does not reach the desired teaching position, after the reference coordinate system is set again as required (Step ST1) and the feed rate is set again (Step ST2), the jog-feed is resumed. In Step ST4, when it is decided that the robot has reached the desired teaching position, the current position of the robot is determined as a teaching point to be stored in the robot (Step ST5), thereby completing position teaching of the one teaching point.

However, in the above teaching method, there are problems in that complicated control of the jog-feed keys requires operator's skill, and a whole teaching operation includes an extremely great number of steps. Further, an operator may execute the jog-feed while erroneously recognizing a setting state of the coordinate system, resulting in the possible occurrence of interference, accident and so forth. Further, an operator has to operate the robot to reach the desired teaching position at the time of teaching, which is one of the reasons for a decreased efficiency of the teaching operation.

SUMMARY OF THE INVENTION

In view of the foregoing, it is an object of the present invention to provide a robot position teaching system in which a robot teaching work can considerably be simplified, and the position teaching work can be executed without possibility of erroneous control due to, for example, erroneous recognition of a coordinate system.

According to the present invention, there is provided a robot position teaching system comprising a visual sensor to measure a three-dimensional position, an image processing device to measure a position by processing and analyzing an image recognized by the visual sensor so as to transmit measurement data to a robot controller, and a position teaching unit provided with a grasping portion having a size which can be grasped by a hand of an operator, and an index which can visually be recognized by the visual sensor, and is disposed at a distal end of a rod-type body extending from the grasping portion. Further, the grasping portion of the position teaching unit includes a moving switch, an approach teaching switch, a position teaching switch (i.e., an arrival teaching switch), and a signal transmitting portion to transmit, to the robot controller, a signal representing that any one of the switches is selectively turned on.

In order to execute the position teaching by using the system, the operator grasps the position teaching unit, and turns on the moving switch in a state in which the position teaching unit is in a visual field of the visual sensor so as to send a moving command to the robot. Subsequently, when the position teaching unit is moved toward a desired teaching position, the visual sensor detects a position of the position index of the position teaching unit. Depending upon the detected position, the robot is moved to follow the position index of the position teaching unit.

When the robot approaches a desired teaching position, the approach teaching switch is turned on to send an approach signal to the robot. Consequently, a visually recognized position of the position index at the time point is taught to the robot. Alternatively, it may be decided that the robot reaches the desired teaching position, and the position teaching switch (or the arrival teaching switch) may be turned on to send an arrival signal to the robot. Consequently, a robot current position at the time is taught to the robot.

According to the present invention, the above position teaching unit is used to replace the steps of teaching work in the prior art shown in FIG. 5 by the simplified steps of teaching work as shown in FIG. 6. That is, in a position teaching method according to the present invention, the system can be operated on a preset coordinate system and the robot can be moved in an optional direction to approach/reach the desired teaching position without a special work by the operator (Step ST1'). When the operator decides that the robot should keep moving (Step ST2'), the process returns to Step ST1'. Otherwise, if it is decided that additional movement of the robot is not required, a teaching position is determined at the time (Step ST3'), thereby completing the position teaching of one teaching point.

As is apparent from a comparison between FIGS. 5 and 6, in the robot position teaching system according to the present invention, it is possible to omit complicated works required in the prior art, including the steps of, for example, setting a reference coordinate system at a time of jog-feed during the position teaching, setting override, and executing the jog-feed by control of shaft operation keys. As a result, according to the present invention, it is possible to considerably simplify the robot position teaching work, and avoid the possibility of the erroneous control due to, for example, the erroneous recognition of the coordinate system at the time of jog-feed, resulting in enhancement of reliability and security in the teaching work.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
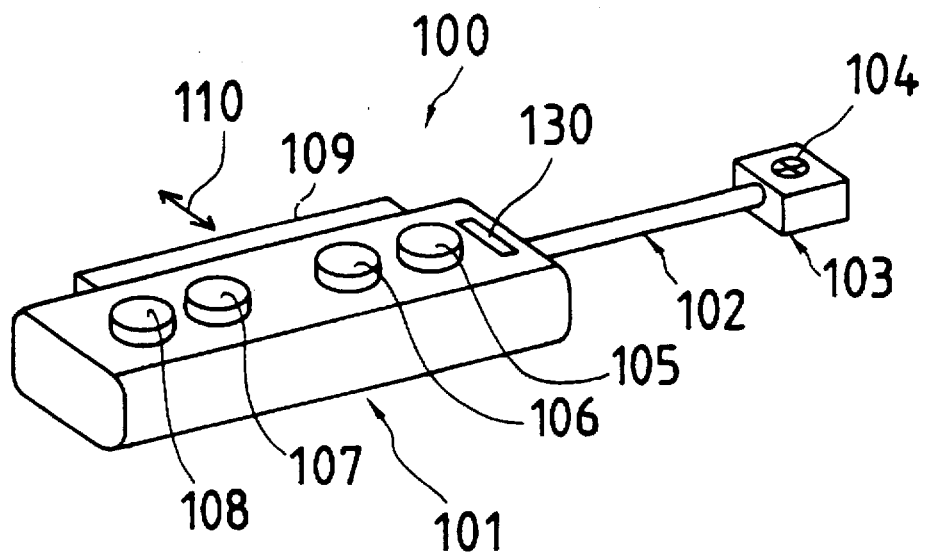
FIG. 1 is a perspective view showing the external appearance of one embodiment of a position teaching unit constituting a robot position teaching system according to the present invention.
Figure 3:
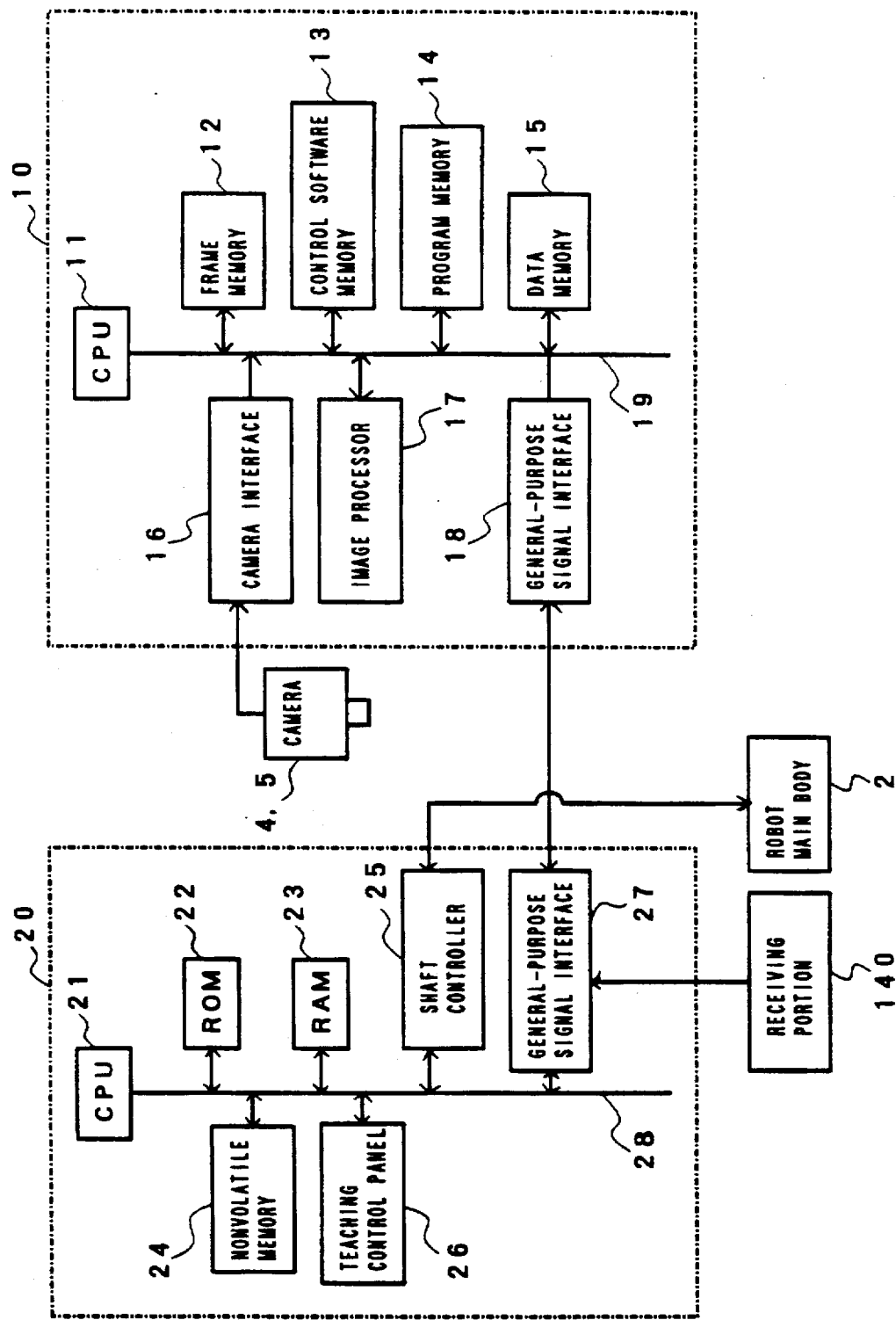
FIG. 3 is a block diagram showing essential components of the robot position teaching system according to the present invention.

A robot position teaching system according to an embodiment of the present invention comprises a position teaching unit 100 shown in FIG. 1, a robot main body 2, a robot controller 20, two cameras 4 and 5 serving as three-dimensional visual sensors, an image processing device 10, and a signal receiving portion 140 which are shown in FIG. 3.

As shown in FIG. 1, the position teaching unit 100 includes a grasping portion 101, a position index portion 103, and a rod-type extending portion 102 interposed therebetween.

The grasping portion 101 is a portion grasped by an operator's hand, and has five switches with push buttons, that is, an ON/OFF switch 105, a moving switch 106, an approach teaching switch 107, an arrival teaching switch 108 (or a position teaching switch), and a deadman switch 109, and a transmitting portion 130 to transmit an ultrasonic wave or infrared rays.

The position index portion 103 includes an index 104 which can visually be recognized by the visual sensor. The index 104 has a cross mark including a member having higher (or lower) optical reflectance than an ambient optical reflectance. Instead of the cross mark, the index 104 may have a dot-type mark, or a dot-type or linear luminescent portion using a light-emitting diode or the like.

Figure 2:
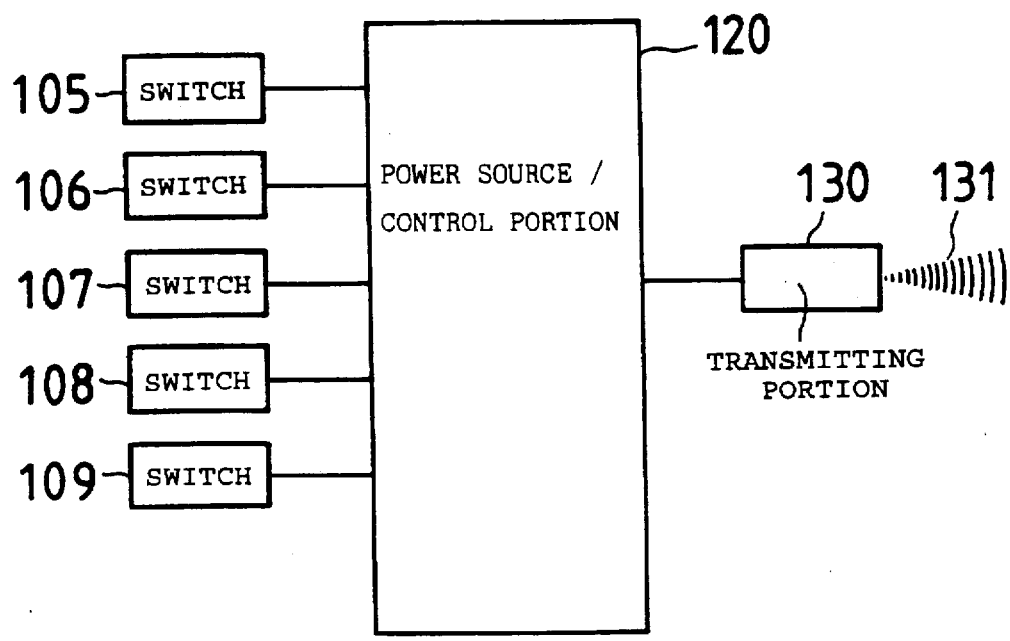
FIG. 2 is a block diagram showing essential components of the position teaching unit shown in FIG. 1.

A power source/control portion 120 is accommodated in the grasping portion 101. As shown in FIG. 2, the power source/control portion 120 houses a power source (a cell) and a microprocessor and is connected to the switches 105 to 109 and the transmitting portion 130. Thus, when any one of the switches 105 to 109 is selectively depressed, the transmitting portion 130 transmits the corresponding ultrasonic wave signal or infrared ray signal 131.

Specifically, the operator firstly grasps the grasping portion 101 of the position teaching unit 100 to depress the button of the deadman switch 109. The ON/OFF switch 105 is turned on so that the position teaching unit 100 is set in a working state. In this state, the moving switch 106 is turned on to, over the entire depressing period, continuously transmit a pulse signal indicating a robot moving command from the transmitting portion 130 to the robot controller (which will be described infra).

The ON state of the moving switch 106 is interrupted so that the robot controller 20 stops movement of the robot. In this state, the approach teaching switch 107 is turned on to transmit, to the robot controller 20, a command signal to teach the robot a position of the index 104 detected by the visual sensor. On the other hand, instead of the approach teaching switch 107, the arrival teaching switch 108 may be turned on to transmit, to the robot controller 20, a command signal to teach the robot a current position of the robot. If the operator leaves hold of the button of the deadman switch 109, the switch 109 is turned off. Therefore, irrespective of the ON/OFF states of other switches, the moving robot is stopped, and the stationary robot is never started.

The image processing device 10 has a central processing unit (hereinafter referred to as CPU) 11, and the CPU 11 is connected through a bus 19 to a frame memory (image memory) 12, a control software memory 13 including a ROM, a program memory 14 including a RAM or the like, a data memory 15 including a nonvolatile RAM, a camera interface 16, an image processor 17 and a general-purpose signal interface 18.

The cameras 4 and 5 are connected to the camera interface 16. The camera interface 16 can sequentially capture a picture signal from the two cameras 4 and 5 by the CPU 11 specifying a connector number in the camera interface 16. The general-purpose signal interface 18 is connected to a general-purpose signal interface 27 of the robot controller 20 so that a signal indicating data or a command is transmitted and received through both the interfaces.

An image recognized in visual fields of the cameras 4 and 5 is converted into a gray image indicated according to a gray scale, and is stored in the frame memory 12. The image processor 17 has the function of processing the image stored in the frame memory 12 according to a command from the CPU 11. The control software memory 13 contains, for example, a control program for control of the visual sensor by the CPU 11, a calibration program to set a sensor coordinate system by using a jig, an image analyzing program to detect a weld line position by using the image processor 17, a program to command measurement data transmission to the robot on appropriate timing, and so forth.

Through a monitor interface (not shown), a monitor can also be connected to visually recognize the image recognized by the cameras 4 and 5 or the image called from the frame memory 12.

The robot controller 20 has a central processing unit (CPU) 21. The CPU 21 is connected through a bus 28 to a ROM 22 containing various control programs including a program to execute processing according to a position teaching procedure as will be described infra, a RAM 23 used for, for example, temporary storage of calculation data, a memory 24 including a nonvolatile RAM containing various setting values such as teaching data, and calibration jig data, a shaft controller 25 (including a servo circuit) to control each shaft of the robot main body 2, a teaching control panel 26 to communicate with the image processing device for, for example, robot manual control, coordinate system setting, position teaching, an automatic operation (playback operation) command, a sensor starting command and so forth, and a general-purpose signal interface 27 connected to the general-purpose signal interface 18 of the image processing device 10.

The general-purpose signal interface 27 is connected to the receiving portion 140 to receive the ultrasonic wave or infrared ray signal 131 transmitted from the transmitting portion 130 of the position teaching member 100.

Figure 4:
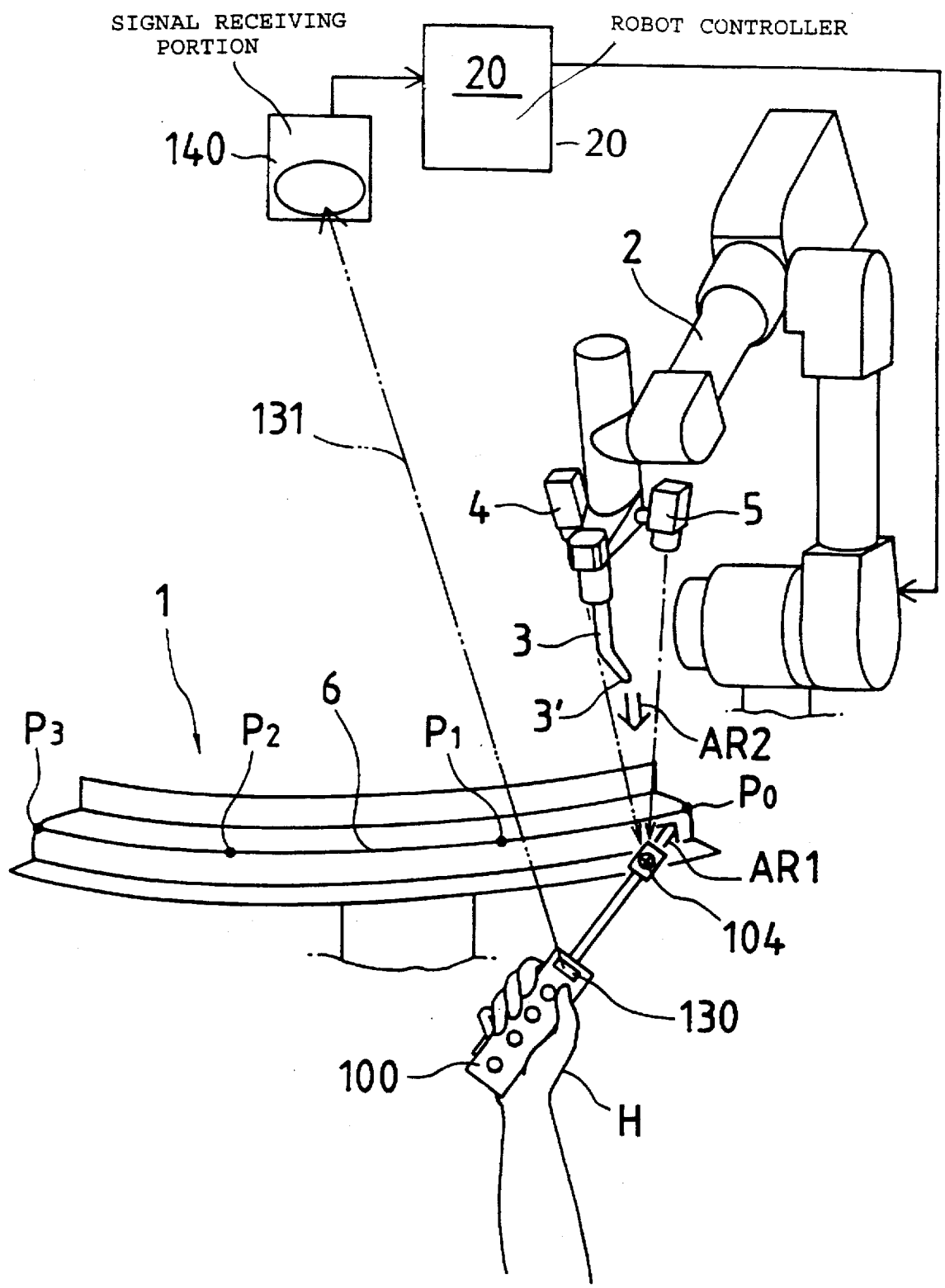
FIG. 4 is a diagram illustrating control to teach a position to a robot by using the position teaching unit of FIG. 1.
Figure 5:
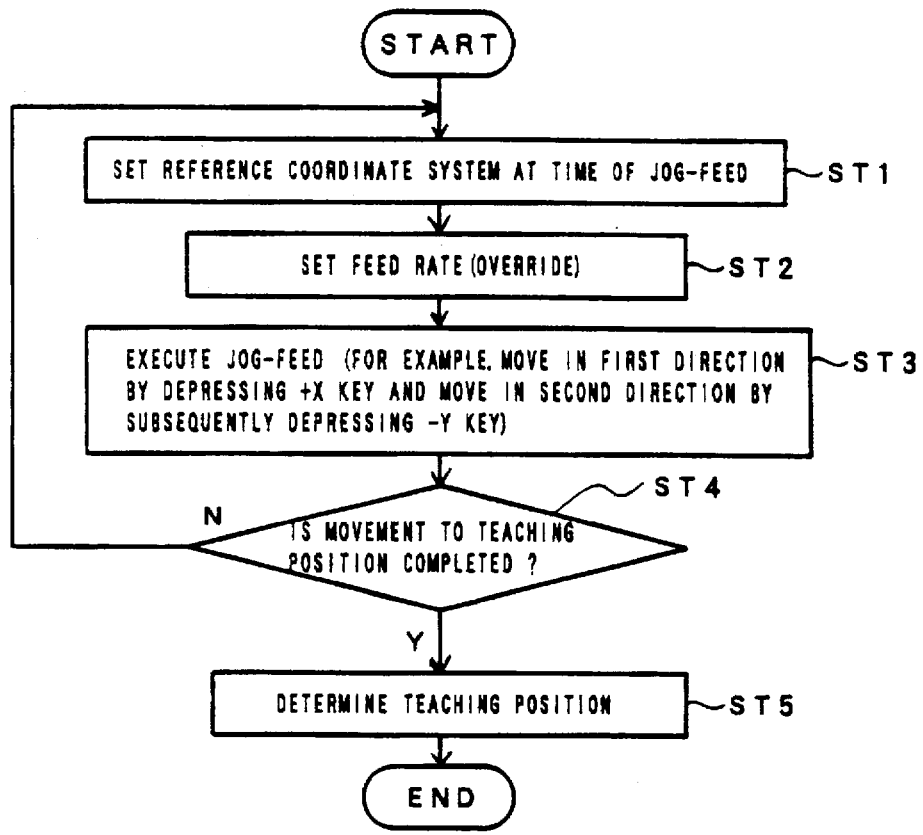
FIG. 5 is a flowchart showing a procedure for teaching a position to a robot according to conventional jog-feed.
Figure 6:
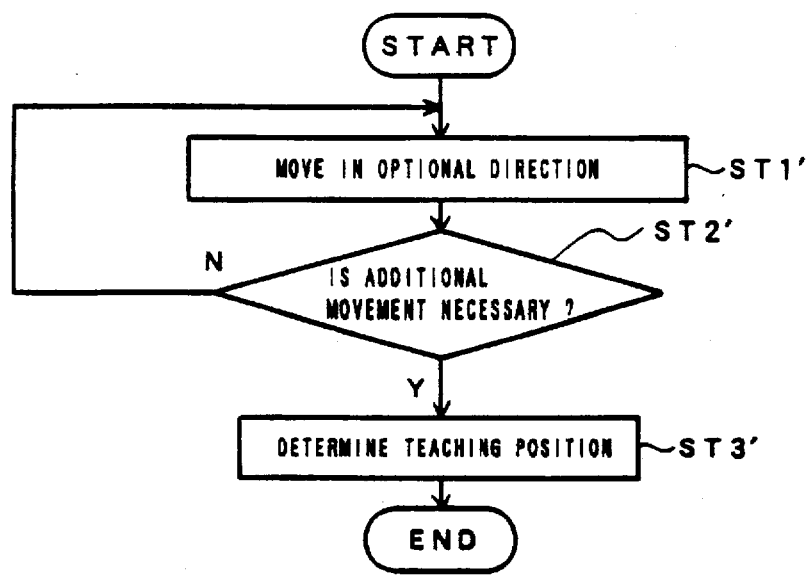
FIG. 6 is a flowchart showing a procedure for teaching a position to a robot in a robot position teaching system according to the present invention.

A description will now be given of the procedure for teaching the position to the robot by using the robot position teaching system including the above components with reference to FIG. 4.

As a workpiece 1 serving as a work object, one workpiece is selected from among many works which can be regarded as having the same type and the same size and having a weld line 6 at the same position.

On the other hand, a wrist flange portion of the robot main body 2 is provided with the two cameras 4 and 5 constituting three-dimensional visual sensor means together with a welding torch 3. Alternatively, the cameras 4 and 5 may be disposed at appropriate positions in a work space without being mounted on the robot.

In the embodiment, desired teaching points P0 to P3 are selected along the weld line 6, and positions thereof are taught in the order of P0, P1, P2 and P3.

Firstly, the operator controls the teaching control panel 26 of the robot controller 20 to start the three-dimensional visual sensor. A hand H grasps the position teaching unit 100 to depress the button of the ON/OFF switch 105 while depressing the button of the deadman switch 109.

Subsequently, the index 104 of the position teaching unit 100 is moved into visual field ranges of both the cameras 4 and 5, and the button of the moving switch 106 is depressed. Consequently, the transmitting portion 130 transmits a robot moving command signal to the signal receiving portion 140 of the robot controller 20. The CPU 21 of the robot controller 20 sends a signal indicating that the image processing device 10 has detected a position of the index 104. In response to the signal, the cameras 4 and 5 take a picture of the index 104 to calculate a three-dimensional position of the index 104 in the image processing device 10. The calculated position of the index 104 is transmitted to the robot controller 20 to start movement of the robot toward the index 104 (i. e., in a direction of the arrow AR2 in FIG. 4). A robot moving speed is held at a relatively low preset rate of a given value or less.

While the position teaching unit 100 is gradually moved to approach the first desired teaching point P0 (i.e., in a direction of the arrow AR1), the button of the moving switch 106 is left depressed. In this state, the position of the index 104 is repeatedly calculated at a short cycle in the image processing device 10, and the result of calculation is continuously transmitted to the robot controller 20.

The robot continues moving while finding a moving target point depending upon continuously updated position data of the index 104. As an operator moves the position teaching unit 100 so that it approaches the desired teaching point P0 and finally the index 104 arrives at the position P0, a distal end of the welding torch 3, that is, a tool center point 3' is moved to follow the index 104 and approach the point P0.

In the case where an operator wishes to teach a position of the point P0 (in order to, for example, avoid interference between the welding torch and the work) before the tool center point 3' arrives at the point P0, he may stop depressing the button of the moving switch 106 to stop the robot at the time when the tool center point 3' has arrived at the vicinity of the point P0, with the index 104 matched with the position P0. And then, in this state, the operator depresses the button of the approach teaching switch 107.

Then, a three-dimensional position of the index 104 is stored as teaching position data in the CPU 21 of the robot controller 20, and the three-dimensional position corresponds to updated data calculated in the image processing device 10. This results in the completion of position teaching of the point P0.

On the other hand, in case where an operator wishes to teach a position of the point P0 after the tool center point 3' has arrived at the point P0, he may stop depressing the button of the moving switch 106 to stop the robot at the time when the tool center point 3' arrived at the point P0, that is, the point of the index 104, with the index 104 matched with the position P0. And then, in this state, the operator depresses the button of the arrival teaching switch 108.

Consequently, an updated robot current position (that is, the position of the index 104) matched with the point P0 is stored as teaching position data in the CPU of the robot controller 20. This results in the completion of the position teaching of the point P0. In this case, the approach teaching switch 107 may be depressed instead of the arrival teaching switch 108, thereby teaching the position data calculated depending upon visual sensor data.

As set forth above, when the robot is provided with the cameras 4 and 5 serving as the visual sensors, as the robot moves closer to the desired teaching position, the cameras 4 and 5 move closer to the desired teaching position so as to oppose the index 104 at desirable incidence angles. Thus, it can be expected to enhance position measuring accuracy by the approach of the cameras 4 and 5. On the other hand, the cameras 4 and 5 may fixedly be disposed at appropriate positions in the work space. In this case, the cameras 4 and 5 never approach the desired teaching position even when the robot approaches the desired teaching position, resulting in constant position measuring accuracy in the cameras 4 and 5.

After the completion of the position teaching of the point P0, the button of the moving switch 105 is depressed again, and the position index portion 103 of the position teaching unit 100 is moved in a direction apart from the point P0 or the vicinity thereof. Then, the robot is moved such that the tool center point 3' follows the index 104 again.

While the position teaching unit 100 is gradually moved to approach the second desired teaching point P1, the button of the moving switch 106 is left depressed so that the tool center point 3' approaches the point P1. As in the first desired teaching point P0, a three-dimensional position of the index 104 is calculated depending upon updated sensor data obtained from the image processing device 10. The three-dimensional position or an updated robot position can be stored as the teaching position data. That is, with the index 104 matched with the position P1, the depress of the button of the moving switch 106 is interrupted to stop the robot before or after the tool center point 3' arrives at the point P1. Thereafter, the approach teaching switch 107 or the arrival teaching switch 108 may be depressed. This results in the completion of the position teaching of the point P1.

In subsequent operation, the same procedure is repeated to perform position teaching of the points P2 and P3, resulting in the completion of position teaching work of all the desired teaching points P0 to P3.

If a weak magnet is incorporated in the position index portion 103 of the position teaching unit 100, the index 104 can more easily be rested at the desired teaching position. It is thereby possible to stabilize the position teaching with respect to a magnetic work.

Alternatively, the index 104 itself may include a light-emitting element, or light-emitting elements may be disposed in the vicinity of the index 104. By using a light-emitting pattern (a geometric light-emitting pattern or a time-varying pattern such as flashing), commands such as a robot moving command, or a teaching execution command are transmitted from the position teaching unit 100 to the image processing device 10 through the cameras 4 and 5, and are discriminated according to software processing. In this case, signal receiving portion 140 (see FIG. 3) connected to the robot controller 20 can be eliminated.

According to the present invention, the three-dimensional visual sensor having the function of measuring a three-dimensional position is typically used as the visual sensor. However, it must be noted that a two-dimensional visual sensor may be used in a special case where, for example, a teaching point is dotted on a known plane. Further, no restriction is imposed on a shape of the position teaching unit, and various shapes thereof are available as long as the position teaching unit has the grasping portion which can be grasped by the operator, and the extending portion required to mount the position index portion at a position which can continuously be viewed from the visual sensor when the operator grasps the grasping portion. The index can have an optional structure as long as the visual sensor can visually recognize a position. For example, the index may include the cross mark or a dot-type mark having a higher or lower optical reflectance than the ambient optical reflectance, or the light-emitting devices. If the light-emitting devices are employed, the light-emitting devices can also serve as transmitting means for transmitting various types of commands from the position teaching unit to the robot.

What is claimed is:

1. A robot position teaching system, comprising:

a robot controller to control a robot;

a visual sensor to measure a three-dimensional position;

an image processing device to measure a position by processing and analyzing an image recognized by the visual sensor so as to transmit measurement data to the robot controller;

a position teaching unit having a grasping portion graspable by a hand of an operator, and an index visually recognizable by the visual sensor, fixed at a distal end of a rod-type body extending from the grasping portion;

said visual sensor being mounted on a hand of the robot to which a position is to be taught;

said grasping portion of said position teaching unit having a moving switch, a position teaching unit having a moving switch, a position teaching switch, and push buttons to selectively turn on or off the respective switches, said grasping portion accommodating a control portion to generate a signal corresponding to the selective ON/OFF state of the respective switches, and including a transmitting portion to transmit the signal generated in said control portion;

wherein said robot controller is connected to a signal receiving portion to receive the signal from said transmitting portion so that said robot controller moves the robot toward a position of the index measured by the image processing device at a given speed or less when said moving switch is turned on in response to action of one of the push buttons, while said robot controller stores a current position of the robot as teaching position data when said position teaching switch is turned on in response to action of another one of the push buttons.

2. A robot position teaching systems, comprising:

a robot controller to control a robot;

a visual sensor to measure a three-dimensional position;

an image processing device to measure a position by processing and analyzing an image recognized by the visual sensor so as to transmit the measurement data to the robot controller;

a position teaching unit having a grasping portion graspable by a hand of an operator, and an index visually recognizable by the visual sensor, fixed at a distal end of a rod-type body extending from the grasping portion;

said visual sensor being mounted on a hand of the robot to which a position is to be taught;

said grasping portion of said position teaching unit having a moving switch, an approach teaching switch, an arrival teaching switch, and push buttons to selectively turn on or off the respective switches, said grasping portion accommodating a control portion to generate a signal corresponding to the selective ON/OFF state of the respective switches, and including a transmitting portion to transmit the signal generated in said control portion;

wherein said robot controller is connected to a signal receiving portion to receive the signal from the transmitting portion, so that said robot controller moves, in response to action of one of the push buttons, the robot toward a position of the index measured by said image processing device at a given speed or less when the moving switch is turned on, while said robot controller stores as teaching position data measurement data obtained at a time of calculation in said image processing device when said approach teaching switch is turned on, or stores as the teaching position data a current position of the robot when said arrival teaching switch is turned on.

3. A robot position teaching unit, comprising:

a position index portion having an index visually recognizable by a visual sensor and movable by a user;

a moving command portion to generate a moving command to the robot to move toward the index based upon the detected visual recognition of the index by the visual sensor; and an approach/arrival signal portion to generate an approach/arrival signal to inform the robot that the robot arrives at or approaches a desired teaching position.

4. A robot position teaching unit according to claim 3, comprising a grasping portion, wherein said position index portion is mounted on a distal end of a rod-type body extending from said grasping portion.

5. A robot position teaching unit according to claim 3, further comprising transmitting means for transmitting the moving command from said moving command portion and the approach/arrival signal from said approach/arrival signal portion to the robot according to a cordless method.

6. A robot position teaching method of teaching a position to a robot by using a robot position teaching unit including a grasping portion, a position index portion having an index visually recognizable by a visual sensor, an extending portion interposed between said grasping portion and said position index portion, a moving command portion to generate a moving command to the robot to move toward the index, and an approach/arrival signal portion to generate an approach/arrival signal to inform the robot that the robot arrives at or approaches a teaching position, comprising the steps of:

transmitting said moving command from said robot position teaching unit to said robot;

finding a position of said index by the visual sensor;

moving said robot toward the found position of said index;

transmitting the approach/arrival signal from said robot position teaching unit to said robot when said robot approaches or arrives at a desired teaching position; and storing a teaching position in said robot depending upon the position of said index found on the basis of updated output from said visual sensor, or upon a current position of the robot at a time of transmission of the approach/arrival signal.

* * * * *